United States Patent [19]

Harder

[11] 4,072,272
[45] Feb. 7, 1978

[54] MULTI-PURPOSE SPREADER
[75] Inventor: Dane Jay Harder, Stratford, Wis.
[73] Assignee: Harco Products, Inc., Stratford, Wis.
[21] Appl. No.: 720,354
[22] Filed: Sept. 3, 1976
[51] Int. Cl.$^2$ ............................................ A01C 15/16
[52] U.S. Cl. ..................................... 239/676; 239/679
[58] Field of Search ............... 239/676, 672, 627, 626, 239/673, 677, 678, 662, 679; 214/82, 83, 514

[56] References Cited
U.S. PATENT DOCUMENTS

| 3,682,333 | 8/1972 | Krause | 239/679 X |
| 3,907,211 | 9/1975 | O'Reilly | 239/676 |

Primary Examiner—Stanley H. Tollberg
Attorney, Agent, or Firm—Andrus, Sceales, Starke & Sawall

[57] ABSTRACT

A multi-purpose spreader for use in handling manure, grain, corn or the like which has a self-contained hydraulically driven power unit actuated from a tractor power take off. A first single acting hydraulic cylinder raises and lowers a drip proof end gate at the rear of the spreader and a second double acting multi-stage hydraulic cylinder which is synchronized to operate with the gate opening cylinder pushes an upright discharge gate from the front of the spreader to the rear to discharge material on the floor of the spreader into beaters at the rear of the spreader when the end gate is in raised position. The beaters are rotated by a hydraulic motor in synchronism with actuation of the end gate and discharge gate to throw the material off the rear of the spreader.

5 Claims, 10 Drawing Figures

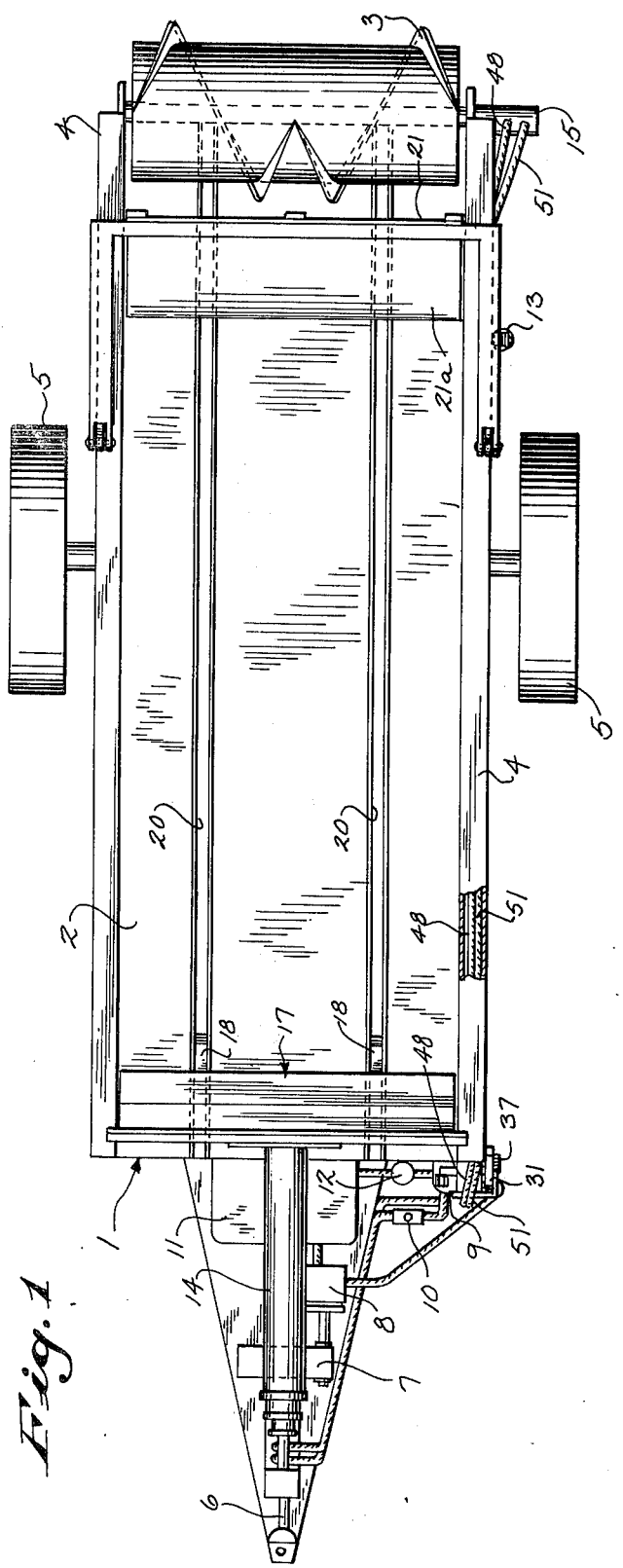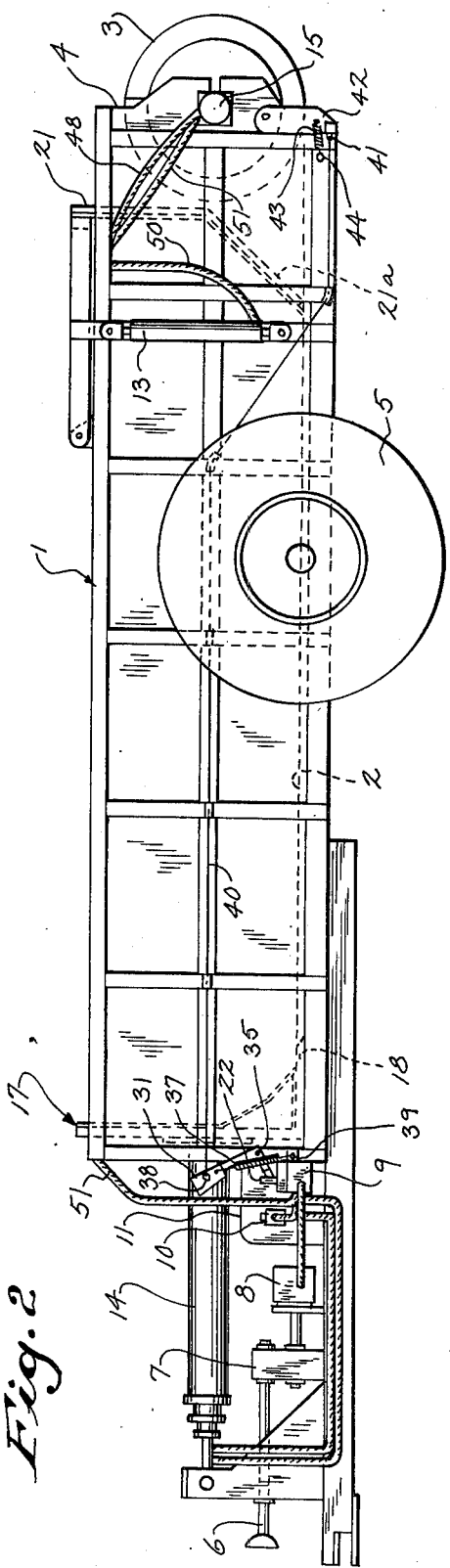

MULTI-PURPOSE SPREADER

BACKGROUND OF THE INVENTION

The present invention is directed to a spreader which is completely hydraulically operated from the power take-off of a tractor. Instead of augers or chains being used to discharge the material from the floor of the spreader, a hydraulically driven upright push gate is employed which engages and pushes the material on the floor of the spreader into hydraulically operated beaters at the rear of the spreader or off the end of the spreader, should the beaters be removed. In addition, the end gate at the rear of the spreader is of a construction to be sealed against the floor when the gate is closed to prevent any drippings from the spreader when it is not in use. The hydraulic system is completed by a damage proof relief mechanism.

SUMMARY OF THE INVENTION

The invention in general relates to a hydraulically operated manure spreader in which all the parts operate automatically in synchronism and which also can be converted into a dump box for hauling grain, corn and the like.

The construction involves a pair of hydraulic cylinders which are operated from the power take off of the usual farm tractor through a control valve, such as a Husco valve, with series motor plungers. One of the cylinders is single acting and raises an end gate at the rear of the spreader when the contents of the box are to be discharged. The end gate is of a construction so that when the end gate is in closed position, the lower end of the gate, which is of flexible material, is sealed against the floor of the spreader to prevent leakage from the rear of the spreader.

The second or push gate cylinder is multi-stage and double acting and is connected to a push or discharge gate to move the latter from the front of the spreader to the rear over the floor of the spreader and discharge material in the spreader into beaters which are rotated by a hydraulic motor to throw the material rearwardly from the spreader. The fluid in the second cylinder is reversed in flow by a tripping mechanism to return the push gate to its forward starting position at a greater speed than when it was driven rearwardly to discharge material from the spreader. The box of the spreader is provided with runner guides which guide the push gate in its rearward and forward travel.

A flow control valve located in the feed line of the push gate cylinder meters the speed at which the push gate cylinder moves the push gate, and the flow control valve is set manually by the operator to the desired speed. In order to provide a damage proof mechanism when the beater is stopped by a heavy load, the push gate hydraulic cylinder automatically slows down or stops due to the construction of the hydraulic system which includes a pressure relief valve which permits only a predetermined pressure to be built up in the system.

BRIEF DESCRIPTION OF THE DRAWINGS

FIG. 1 is a top plan view of the multi-purpose spreader with parts in section and elevation;

FIG. 2 is a side view of the spreader illustrated in FIG. 1;

DETAILED DESCRIPTION OF THE PREFERRED EMBODIMENTS

Figure 3:
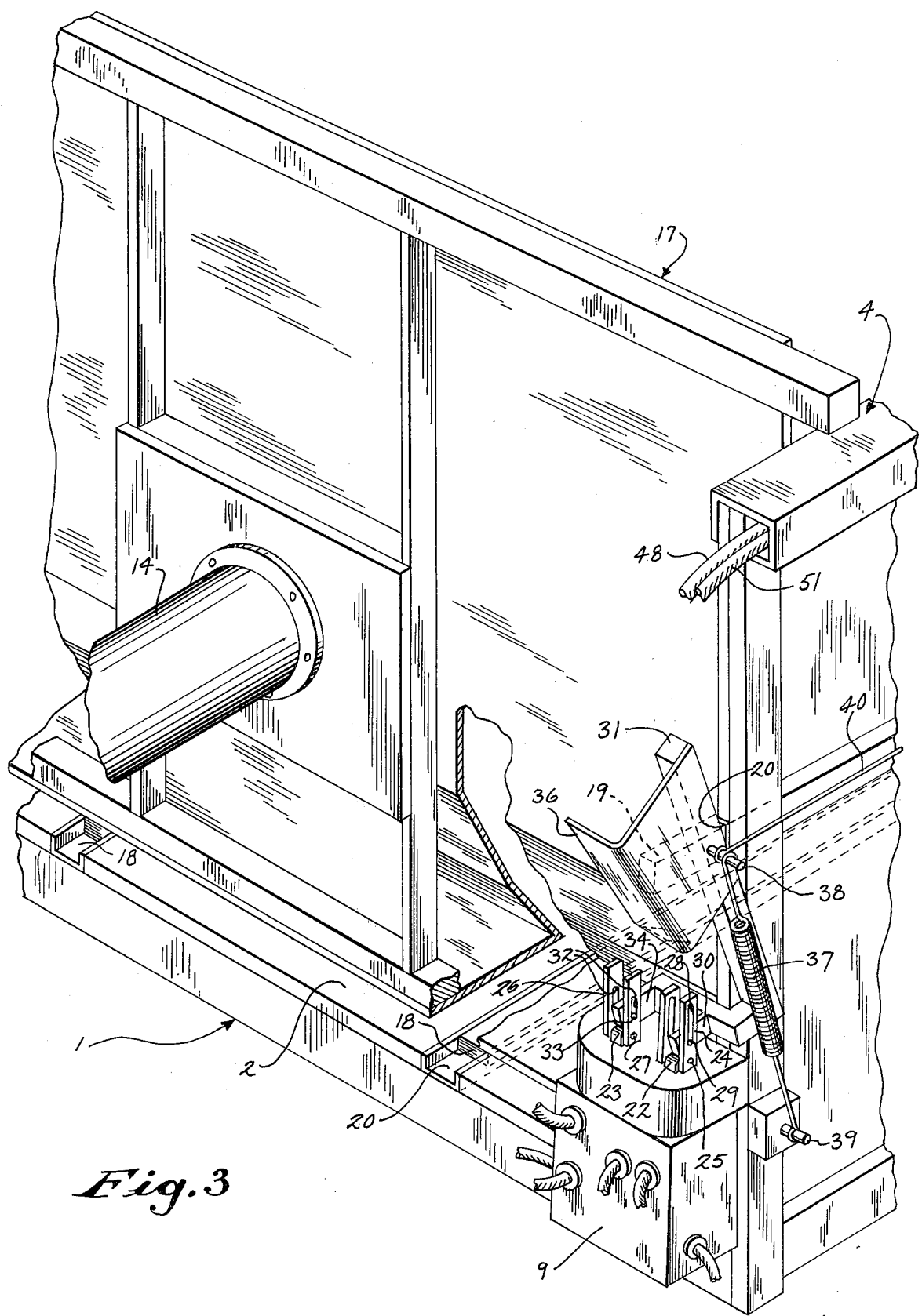
FIG. 3 is an enlarged detailed view of the right front side of the spreader with the control arm held by the coil spring in the forward or energizing position and with the hydraulic tubing removed and parts broken away and sectioned.

Referring to the drawings, there is shown in FIGS. 1 and 2 a manure spreader or the like which has the usual box 1 closed at the bottom by the floor 2 and the beaters 3 at the rear which are secured to the frame 4 of the box. The box is supported by the wheels 5.

The spreader derives its power from the power take off of the usual farm tractor, which is controlled by the tractor operator. The power take off of the tractor, not shown, is connected to the drive shaft extension 6 of the spreader. Drive shaft extension 6 drives the speed increaser 7 which is connected to pump 8 and drives the latter.

Figure 10:
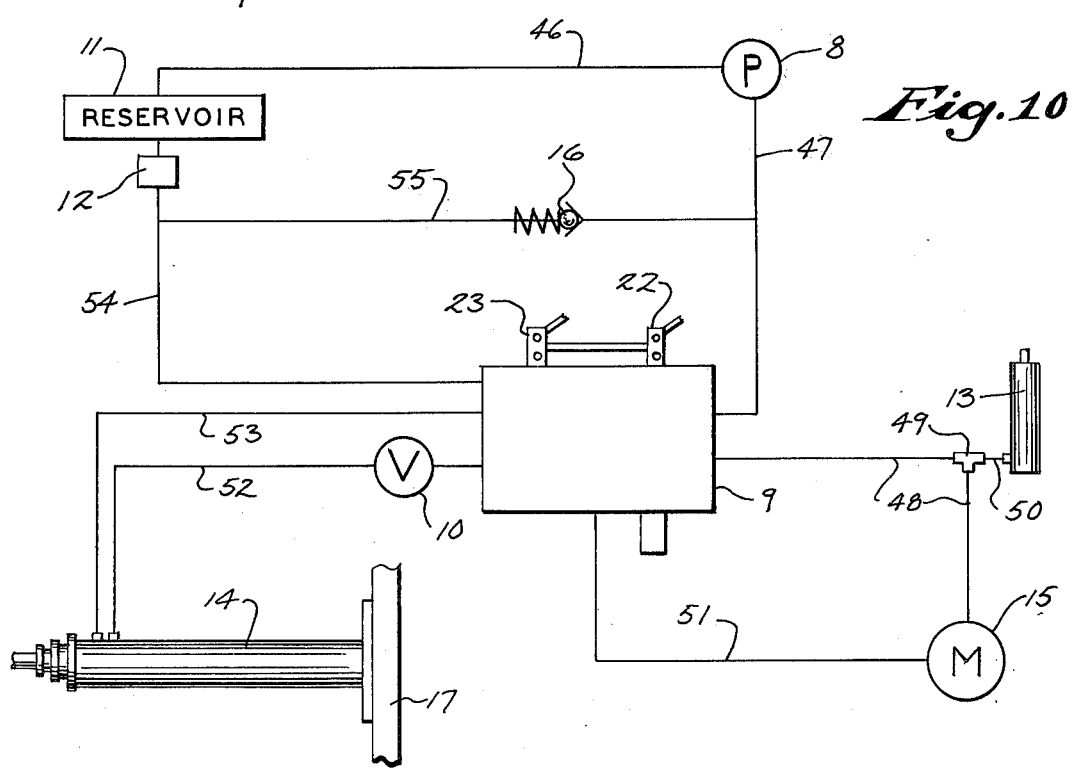
FIG. 10 is a diagrammatic view of the control valve of the invention and the network of the hydraulic system.

The spreader has a completely self-contained hydraulic system which, as shown in FIGS. 1, 2 and 10, consists of pump 8, a control valve 9, a flow control or metering valve 10, a hydraulic oil reservoir 11, and oil filter 12, a single acting end gate cylinder 13, a multistage double acting push gate cylinder 14, a hydraulic motor 15 to rotate beaters 3, a pressure relief valve 16 and requisite tubing for carrying the hydraulic fluid to the various components of the system.

The spreader inside the box 1 has a discharge or push gate 17 which extends across the floor 2 of box 1 and has a plow-like blade at the bottom end and is of a height to engage the manure or other material which may extend to the top of box 1. The shoes 18, which are tapered at the rear end, are secured in horizontally spaced relation to the bottom of push gate 17, and shoes 18 and the runners 19 on each side of push gate 17 are received in the guides or grooves 20 in floor 2 and the frame 4 of box 1. Push gate 17 is actuated rearwardly and forwardly within box 1 by the double acting multistage hydraulic push gate cylinder 14.

Figure 7:
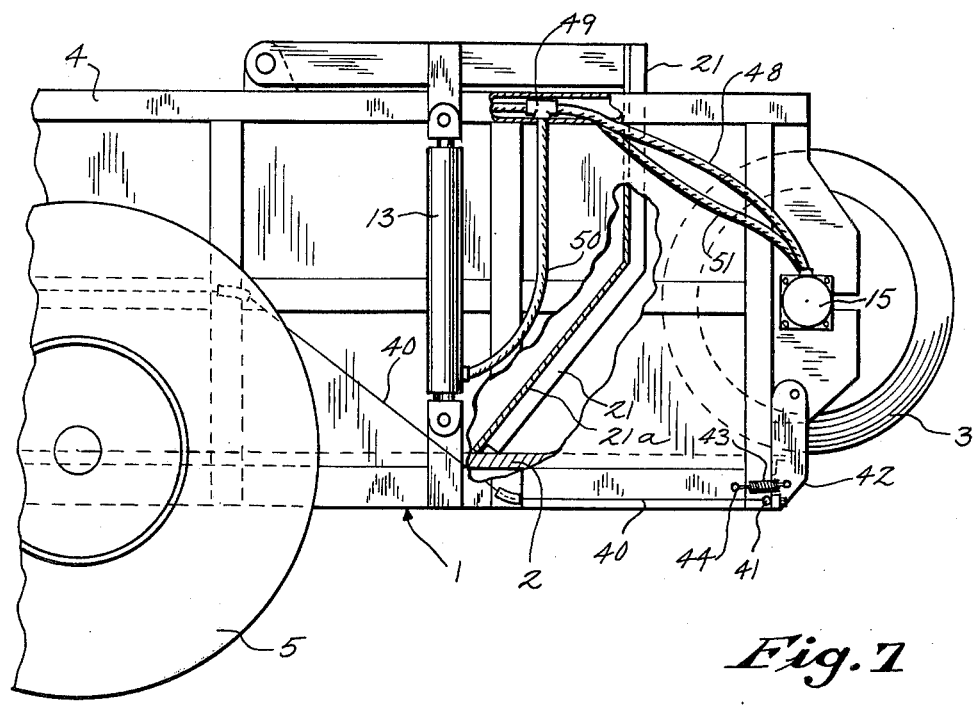
FIG. 7 is a side view of the rear of the spreader with parts in section and in phantom and with the end gate in the closed position.

Box 1 is closed at the rear by an end gate 21. End gate 21 has an irregular shape with the lower portion extending forwardly on an angle so that it fits the contour of the inside of box 1 and rests in sealing engagement with floor 2. When end gate 21 is in closed position, as shown in FIG. 7, the flexible material 21a secured to the inside of gate 21 and projecting therefrom engages floor 2 to provide a drip proof seal with the floor 2 at the rear end of the spreader. End gate 21 is pivoted to frame 4 to be opened and closed hydraulically by the end gate cylinder 13 which is pivoted to the end gate approximately generally centrally of the arm of end gate 21.

The control valve 9 which is secured to frame 4 at the forward end of the apreader, is actuated by a pair of plungers 22 and 23 which open and close passages in control valve 9 to control the flow of hydraulic fluid through the system. The plunger 22 is secured to the bracket 24 by pin 25, and plunger 23 is secured to bracket 26 by pin 27. Bracket 24 has elongated slots 28 through which extends a pin 29 which pivots bracket 24 to the short arm 30 extending forwardly from the control arm 31. In turn, bracket 26 has shorter elongated slots 32 through which extends the pin 33 which pivots bracket 26 to short arm 34 extending forwardly of the control arm 31. Control arm 31 is pivoted to frame 4 by pin 35 and the control arm 31 is movable to forward, retracted and neutral positions. Plungers 22 and 23 are connected to sleeve valves, not shown, in control valve 9 of the Husco type to open and close passages in valve 9 in a well known manner for flow of fluid in the system. The plungers 22 and 23 are initially actuated by the operator who moves the control or lever arm 31 which is connected to brackets 24 and 26 to a forward position. This sets the hydraulic system in motion and from there on the control arm 31 is operated automatically to reverse flow of fluid in the system and to return the system to a neutral position.

The upper part of control arm 31 has an inwardly turned flange 36 so that it may be engaged by the runner 19, as seen in FIG. 3, and shifted automatically to retracted and neutral position. The coil spring 37 is secured at the upper end to the peg 38 on the control arm 31 and at the lower end to the peg 39 on frame 4. The coil spring 37, as illustrated, holds the control arm 31 in a forward position, as seen in FIG. 3, when the arm 31 is moved forwardly over center of spring 37 or in retracted position when the fluid in the system is reversed in flow and arm 31 is moved rearwardly over center of spring 37, as illustrated in FIG. 4, or in a neutral position when arm 31 is in line with coil spring 37, as shown in FIG. 5.

Forward movement of control arm 31 is limited by the downward position of plungers 22 and 23, as shown in FIGS. 3 and 10. Rearward movement of control arm 31 beyond a certain distance is prevented by the flange 36 which engages frame 4 at the front of the spreader.

Figure 9:
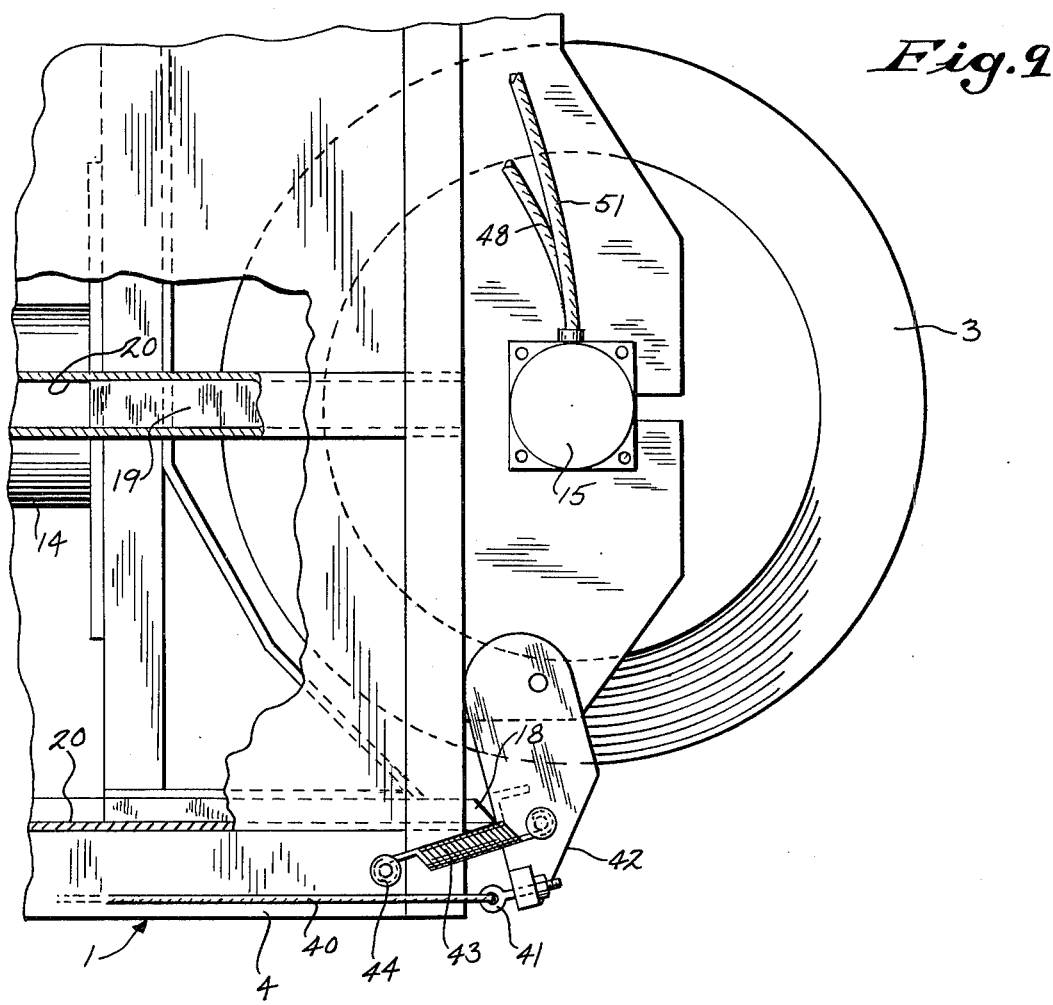
FIG. 9 is a detailed view of the rear of the spreader which illustrates the end gate in closed position and the tail section pivoted rearwardly by the shoes on the push gate.

The upper peg 38 on control arm 31 has secured thereto a cable 40 which extends along the lower side of box 1 and is secured at the rear end to an eye bolt 41 which is threaded into and bolted to the tail gate 42. Tail gate 42 is in turn pivoted at the upper end to the rear end of frame 4 within which is located the hydraulic motor 15. The lower end portion of tail gate 42 above eye bolt 41 is engaged by coil spring 43, and the forward end of spring 43 is hooked to abutment 44, as seen in FIG. 9, extending from that portion of frame 4 located at about the level of floor 2.

Figure 4:
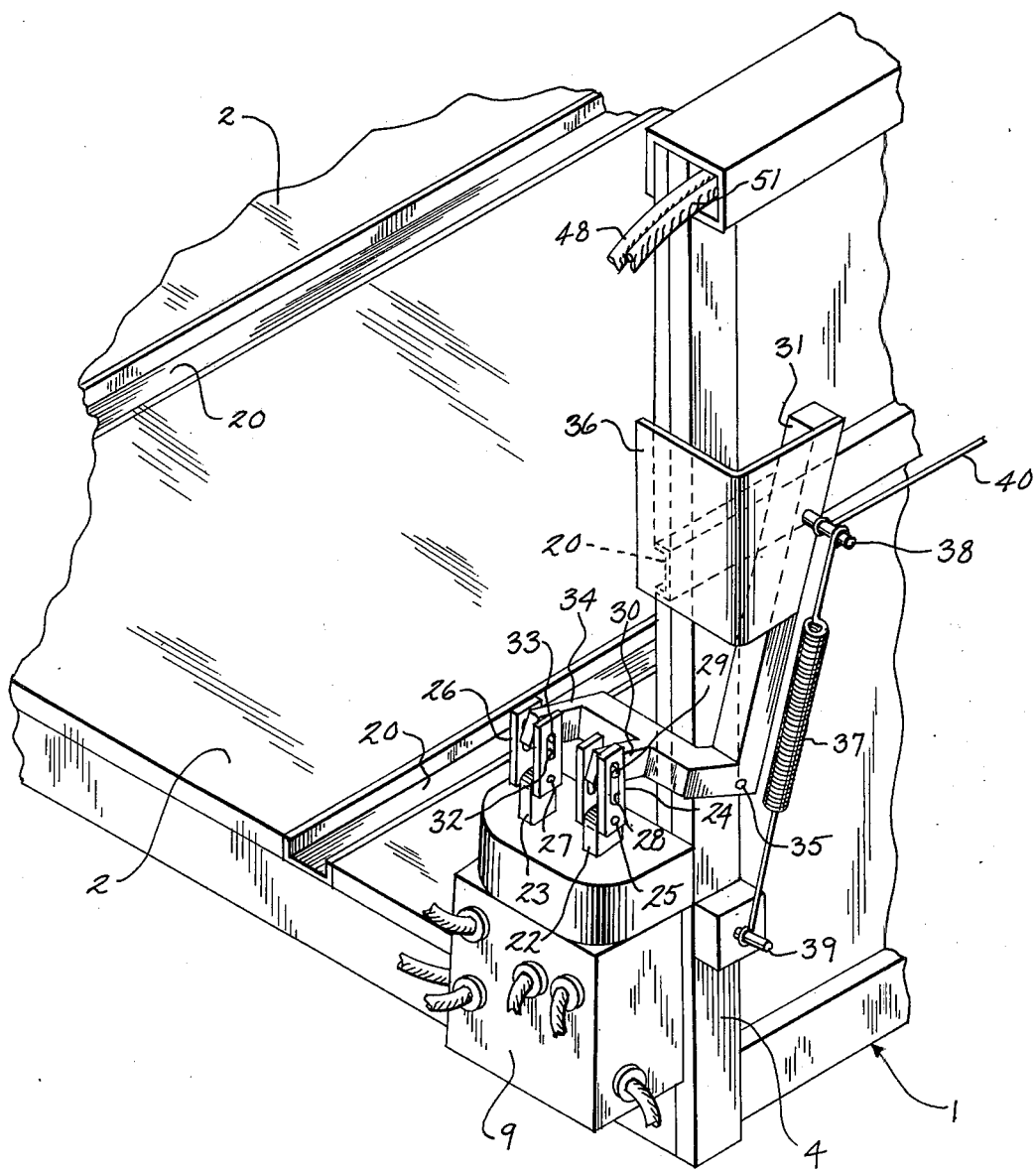
FIG. 4 is an enlarged detailed view of the right front side of the spreader with the control arm in rearward position and with the hydraulic tubing removed.
Figure 5:
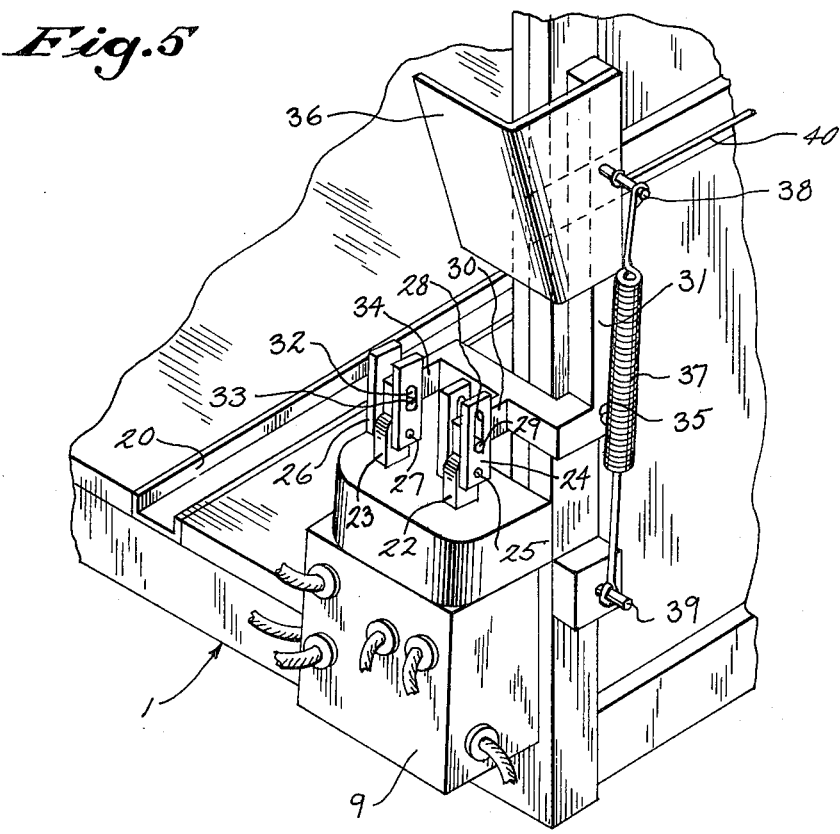
FIG. 5 is an enlarged detailed view of the right front side of the spreader with parts removed and illustrating the control arm in neutral position.

The drawings in FIGS. 3, 4 and 5, respectively, illustrate the three positions of the control arm 31, and FIG. 10 illustrates diagrammatically the positions of plungers 22 and 23 the pins 29 and 33 in the respective slots 28 and 32 of the brackets 24 and 26 when the control arm 31 is in the forward, retracted and neutral position. The slots 28 in the righthand bracket 24 are longer than the slots 32 in the second or lefthand bracket 26. Righthand plunger 22 is spring supported by the centering spring 45 which is located, not shown, in a housing extending from the bottom of the housing of control valve 9.

Referring to FIG. 10, in the forward position of control arm 31, as seen in FIG. 3, the pins 29 and 33 connected to short arms 30 and 34 in the down position in their respective slots 28 and 32 in brackets 24 and 26 and spring 45 is compressed. In the retract position, as seen in FIG. 4, brackets 24 and 26 carrying plungers 22 and 23 have moved upwardly and pin 29 in the bracket 24 is located about centrally of the slots 28 and the centering spring 45 is distended. The pin 33 of the bracket 26 is then in the uppermost position in slots 32. When control arm 31 is in the neutral position, as shown in FIGS. 5 and 10, the brackets 24 and 26 are in an upward position corresponding to that of the retract position but the pins 29 and 33 of brackets 24 and 26 are in the lowermost position in their respective slots 29 and 32. The centering spring 45 is slightly more distended than in the retract position.

The slots 28 in the bracket 24 for first or spring loaded plunger 22, as previously described, are longer than the slots 32 in bracket 26 for the second plunger 23. When the control arm is in retracted position and the first plunger 22 is forced to a neutral position, it is held in such position by spring 45. This shuts off the flow of the hydraulic flow of fluid to beater 3 while leaving the second plunger 23 in a position so that all the hydraulic fluid can flow to the push gate cylinder 14 and quickly return push gate 17. The slots 28 in the bracket 24 are longer than slots 32 of the second bracket 26 because otherwise the first plunger 22 would move too far upwardly, resulting in opening a passage, not shown, in control valve 9 causing flow of fluid to beater 3 and reverse rotation of the beater. Coil spring 37 is of greater strength than spring 45 so that spring 45 does not effect the operation of spring 37.

The network of tubing which carries the hydraulic fluid in the hydraulic system, as illustrated diagrammatically in FIG. 10, consists of the line 46 extending between reservoir 11 and pump 8 and then a line 47 which enters the right side of the control valve 9. The hydraulic line 48 extends from control valve 9 to the rear of the spreader such as along the top of box 1 to the tee 49 and then to hydraulic motor 15. A branch line 50 extends from tee 49 to hydraulic cylinder 13. In the hydraulic system three times as much force is required to operate cylinder 13 compared to the force required to operate hydraulic motor 15, and the fluid in the system follows first the path of least resistance to cylinder 13 through branch line 47 and also flows through line 45 to motor 15.

From hydraulic motor 15 the hydraulic line 56 extends to the front of the spreader, as along the top of box 1, to the left side of the control valve 9.

Upon return of the fluid from motor 15 to control valve 9, it then flows through line 52 and through metering valve 10 to the forward end of double acting hydraulic push gate cylinder 14. Metering valve 10 meters the speed at which the push gate cylinder 14 moves the push gate 17 rearwardly of box 1 to push the material off the rear end of box 1 or into beaters 3. Metering valve 10 may be set manually by the operator to the desired speed and is pressure compensated which permits the push gate 17 to move at a constant speed.

Upon reversing the flow of fluid in the system by retracting control lever 31 to the position shown in FIG. 4, the fluid flow is cut off to end gate cylinder 13 and motor 15 which operates beater 3, and all the fluid then flows through line 53 from control valve 9 to quickly retract cylinder 14. When cylinder 14 is back in neutral position, the control arm or lever 31 moves to the neutral position shown in FIG. 5. The fluid then flows from control valve 9 to reservoir 11 through line 54 and filter 12.

In the event that pressure is built up in the hydraulic system, such as by the clogging of beaters 3 so that they are stopped or slowed in rotation, then the pumped fluid bypasses the cylinders through line 55 back to reservoir 11 because of the pressure relief valve 16 located in line 55 which allows only a predetermined pressure to be built up in the system. The pressure valve 16 can be located in control valve 9 but is shown in line 55 in the drawing for purposes of illustration.

The automatic operation of the described spreader commences when the operator moves control arm 31 forwardly over center, as illustrated in FIG. 3, and after the power take off 6 has been actuated from the tractor to start speed increaser 7 and pump 8. In this position, as illustrated in FIG. 3, the plungers 22 and 23 are held in the downward position by action of the tension spring 37 upon control arm 31, as illustrated by the position of pins 29 and 33 in slots 28 and 32 in FIG. 6. Centering spring 45 is then in a compressed position, as shown in FIG. 10.

Figure 8:
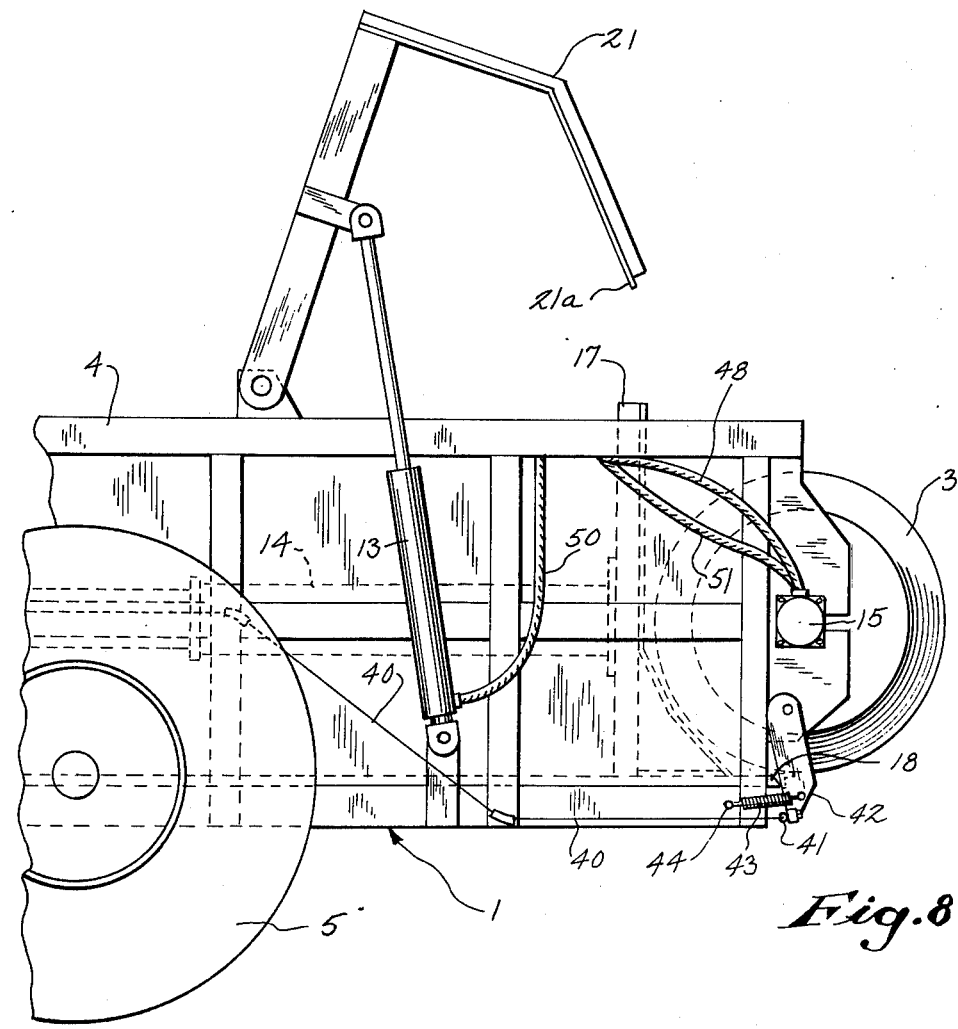
FIG. 8 is a view corresponding to FIG. 7 but showing the end gate in open position.

The hydraulic fluid is then pumped from reservoir 11 by pump 8 to control valve 9 through lines 46 and 47 and is flowed from valve 9 to end gate cylinder 13 through line 48 and branch line 50 extending from tee 49. The end gate cylinder 13 then proceeds to raise end gate 21 up and out of box 1 to the open position, as illustrated in FIG. 8. The hydraulic fluid then continues its flow through line 48 to hydraulic motor 15 which is actuated to rotate beaters 3.

The hydraulic fluid thereafter flows from motor 15 back to the front of the spreader to control valve 9 through line 51 and then passes through line 52 and metering valve 10 to the push gate cylinder 14 to expand the latter. This causes push gate 17 to move rearwardly to discharge the contents of box 1 to beaters 3 or out of box 1 when beaters 3 are removed. The end gate 21 in the raised position does not interfere with the discharging movement of push gate 17.

At the end of the stroke of push gate cylinder 14, the shoes 18 located on the bottom of push gate 17 engage tail gate 42 and pivots tail gate 42 upwardly, as illustrated in FIG. 8. This results in pulling the control arm 31 rearwardly over center of spring 37, as illustrated in FIG. 4, by means of the trip cable 40 connected at the rearward end to eye bolt 39 on tail gate 42 and at the forward end to peg 38 on control arm 31. The tension spring 37 then holds the control arm in the retracted position, as illustrated in FIG. 4.

Figure 6:
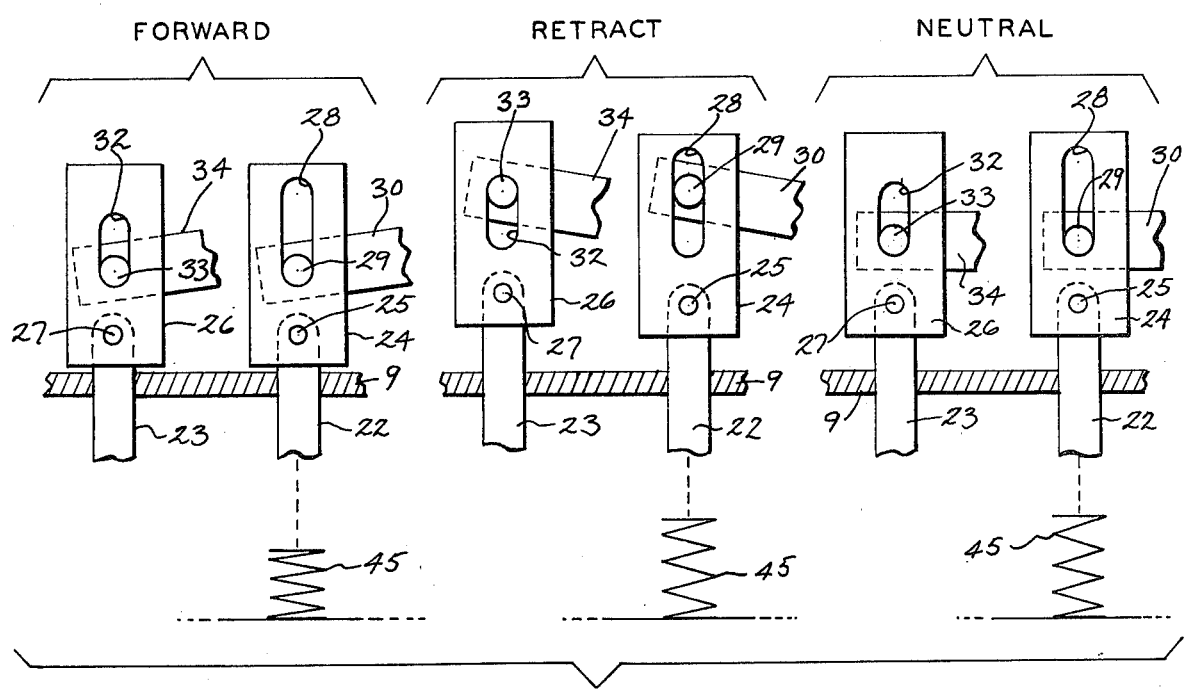
FIG. 6 is a diagrammatic view illustrating various positions of the plungers and showing the position of the pins which guide the plungers in their respective slots.

By tripping control arm 31 rearwardly over center, the plungers 22 and 23 are pulled upwardly and the control arm 31 assumes the rearward position illustrated in FIG. 4 and pins 29 and 33 are located within the respective slots 28 and 32, as illustrated in FIG. 10. The fluid flow is then reversed and all the fluid in the system then flows through control valve 9 and line 53 into the rear side of push gate cylinder 14 to quickly retract push gate 17. When the flow of fluid is reversed, rotation of beaters 3 stops because no fluid, due to the position of plunger 22, is flowing to the end gate cylinder 21 of the hydraulic motor 15. Upon return of the push gate 17 to the front of the spreader, the runners 19 engage control arm 31 and move control arm 31 forward to the neutral position, as shown in FIG. 5. In this position the pins 29 and 33 of plungers 22 and 23 are in the position in the respective slots 28 and 32, as illustrated in FIG. 6. All action of the hydraulic system is now stopped, but before the neutral position of control arm 31 is reached, there is sufficient fluid in the system to maintain end gate 21 in an open position until push gate runners 19 engage control arm 31 and move it to neutral position. In this position of control arm 31 the hydraulic pressure in that part of the system connected to cylinder 13 operating end gate 21 is decreased because of the reverse flow to control valve 9 which permits end gate 21 to gently pivot to its closed sealing position.

After operation of the cycle of the hydraulic system has been completed and the system is shut down, the coil spring 43 attached to the lower portion of tail gate 42 and to frame 4 holds tail gate 42 in tight engagement with frame 4. This keeps the trip mechanism functioning in its proper sequence and prevents premature tripping of the system.

Damage proof protection to the system in the event, for example, that beater 3 slows down or is stopped by a heavy load such as rocks or the like in the contents being discharged from the spreader, is controlled by opening of pressure relief valve 16 and consequent flow of the fluid back to the reservoir 11 through line 55.

The spreader described provides a completely automatically hydraulically driven spreader which derives its power from the power take off of the usual farm tractor. The raising of the rear end gate which seals the rear of the spreader box against drippings therefrom is hydraulically operated in synchronism with the hydraulic motor operating the beaters and with the push gate which discharges the contents of the spreader, so that the gate is automatically raised when the push gate is discharging and is automatically closed when the push gate has returned to its forward starting position and rotation of the beaters is stopped. The end gate is constructed to be securely sealed at the bottom against floor 2 of box 1 to prevent drippings being discharged from the spreader when it is not in use.

In addition, damage to the spreader is prevented by a pressure relief control valve which can be set to a predetermined pressure to open and eliminate any excessive buildup of hydraulic pressure in the system by flow of fluid back to the reservoir and not to the actuating cylinders of the system.

Various modes of carrying out the invention are contemplated as being within the scope of the following claims particularly pointing out and distinctly claiming the subject matter which is regarded as the invention.

I claim:

1. A farm material spreader adapted to be mechanically actuated from a power take off of a powered vehicle, which comprises a wagon box having a floor, a frame and confining walls on the front and sides secured to the frame, an upright push gate normally located at the forward end of the wagon box, an end gate pivoted at the rear end of the box to normally seal off the rear end of the spreader, a hydraulic system contained entirely on the spreader including a double acting multi-stage hydraulic cylinder directly connected to the push gate and adapted to reciprocate the push gate back and forth within the box to move the contents of the box to the rear of the box for discharge therefrom, a second hydraulic cylinder connected to the end gate and adapted to raise and lower the end gate, a beater secured to the box at the rear, a hydraulic motor connected to the beater to rotate the latter, a network of tubing to carry hydraulic fluid to the respective cylinders and to the hydraulic motor, a reservoir for the fluid, a filter, a pump to actuate the fluid, a control valve adapted to control the flow of fluid in the system, and when the pump is set in operation by manual actuation of the control valve and the power take off hydraulic fluid flows through the tubing to supply the fluid to the respective cylinders to automatically actuate the same in a synchronized manner whereby the end gate is pivoted upwardly to a position removed from the push gate when the latter completes its stroke at the rear of the spreader, and the hydraulic motor is simultaneoudly actuated to hydraulically rotate the beater.

2. A farm material spreader adapted to be mechanically actuated from the power take off of a wheeled vehicle which comprises a wagon box having a floor, a frame and confining walls on the front and sides secured to the frame, an upright push gate normally located at the forward end of the wagon box, an end gate pivoted at the rear end of the wagon box, a push gate hydraulic cylinder to actuate the push gate and an end gate cylinder to actuate the end gate, a beater secured to the box at the rear, a hydraulic motor connected to the beater to rotate the latter, a network of tubing carrying fluid to the cylinders and hydraulic motor, a control valve adapted to control the flow of fluid in the system, a control arm pivoted at the lower end to the frame of the spreader adjacent the forward end, a coil spring connected to the frame at the lower end and to the control arm at the upper end to hold the control arm in either a forward, retracted or neutral position, first and second plungers extending upwardly from the control valve forward of the control arm, first and second brackets located forwardly of the control arm in line with said plungers, means connecting each bracket to a respective plunger, elongated slots in each bracket with the slot in the first bracket being longer than the slot in the second bracket, pin means extending through the slots and forward extensions of the control arm to pivot the control arm to the brackets within said slots, a centering spring connected to the first plunger to prevent upward movement of the first plunger beyond a line where reverse flow of hydraulic fluid in the system would be effected to reverse drive the beater, and the control valve being manually movable to a forward position to initiate the flow of fluid through the system to the hydraulic cylinders and hydraulic motor and automatically operated thereafter to a retracted position to reverse the flow of fluid in the system and then to a neutral position to shut down the hydraulic system, and the limiting of the movement of the first plunger by the centering spring in the retracted position of the plungers effecting shut down of the rotation of the beater and flow of all the return fluid to the push gate hydraulic cylinder to quickly return the push gate to the forward end of the spreader, and means on the push gate engaging the control arm to move the latter to neutral position and shut down the hydraulic system.

3. The spreader of claim 2, and a coil spring secured at the lower end to the frame and at the upper end to the control arm to hold the control arm at an angle whereby the plungers are in energized position, a cable having the forward end thereof secured to the upper end of the control arm and extending rearwardly to the rear end of the wagon box, a tail gate pivoted at the upper end portion to the frame at the rear of the wagon box and the rear end of said cable being secured to the lower portion of the tail gate, a coil spring secured to the frame and to the tail gate to normally bias the tail gate in a forward closed position, and shoe means located on the bottom of the push gate to the rear thereof whereby when the push gate reaches the rear of the wagon box said shoe means engages the tail gate to pivot the latter outwardly to open position whereby said cable is pulled rearwardly with the resultant pulling of the control arm rearwardly over center and the raising of said plungers to a retracted position to reverse the flow of the hydraulic fluid in the system and flow all the fluid in the system to the push gate cylinder resulting in rapid return of the push gate to its original forward position and gradual lowering of the tail gate to its sealing position.

4. The spreader of claim 2, and means on the push gate to engage the control arm upon return of the push gate to starting position to move the control arm to neutral position and shut down the flow of hydraulic fluid in the system.

5. The spreader of claim 2, and a pressure relief valve located in the system and set at a predetermined pressure to open a bypass passage to the reservoir to return fluid thereto without flowing to the cylinders in the event the beater becomes clogged with foreign material or the system otherwise malfunctions.

* * * * *